(12) United States Patent
Hefty

(10) Patent No.: US 9,495,324 B2
(45) Date of Patent: Nov. 15, 2016

(54) EFFICIENT DISTRIBUTION OF SUBNET ADMINISTRATION DATA OVER AN RDMA NETWORK

(71) Applicant: Mark S. Hefty, Aloha, OR (US)

(72) Inventor: Mark S. Hefty, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 743 days.

(21) Appl. No.: 13/850,339

(22) Filed: Mar. 26, 2013

(65) Prior Publication Data

US 2013/0262613 A1 Oct. 3, 2013

(51) Int. Cl.
*G06F 15/167* (2006.01)
*G06F 15/173* (2006.01)
*H04L 12/24* (2006.01)

(52) U.S. Cl.
CPC ....... *G06F 15/167* (2013.01); *G06F 15/17331* (2013.01); *H04L 41/04* (2013.01)

(58) Field of Classification Search
None
See application file for complete search history.

(56) References Cited

U.S. PATENT DOCUMENTS

| | | | |
|---|---|---|---|
| 6,941,350 B1 | 9/2005 | Frazier | |
| 6,978,300 B1* | 12/2005 | Beukema | H04L 12/24 370/230 |
| 7,099,337 B2 | 8/2006 | Pinto | |
| 7,409,432 B1 | 8/2008 | Recio | |
| 7,636,772 B1 | 12/2009 | Kirby | |
| 7,895,601 B2 | 2/2011 | Benner et al. | |
| 2003/0103455 A1* | 6/2003 | Pinto | H04L 45/02 370/230 |
| 2004/0120332 A1* | 6/2004 | Hendel | H04L 12/5693 370/411 |
| 2005/0080946 A1* | 4/2005 | Hosoya | G06F 3/0614 710/33 |
| 2006/0047868 A1* | 3/2006 | Rohde | H04L 49/9052 710/56 |
| 2008/0168471 A1* | 7/2008 | Benner | H04L 49/90 719/314 |
| 2009/0006796 A1* | 1/2009 | Chang | G06F 21/805 711/163 |
| 2010/0138532 A1 | 6/2010 | Glaeser | |
| 2010/0332908 A1* | 12/2010 | Johnsen | H04L 12/6418 714/39 |
| 2013/0007180 A1* | 1/2013 | Talpey | H04L 47/722 709/212 |

FOREIGN PATENT DOCUMENTS

| | | |
|---|---|---|
| CN | 1607785 | 4/2005 |
| WO | 2013/147829 A1 | 10/2013 |

OTHER PUBLICATIONS

International Preliminary Report on Patentability and Written Opinion received for PCT Patent Application No. PCT/US2012/031357, mailed on Oct. 9, 2014, 6 pages.
International Search Report and Written Opinion from related PCT/US2012/031357 filed Mar. 30, 2012.
Office Action received for China Patent Application No. 201280072152.1, mailed on May 5, 2016, 5 pages of English Translation and 19 pages Of Chinese Office Action.

* cited by examiner

*Primary Examiner* — Joshua Joo
*Assistant Examiner* — Younes Naji
(74) *Attorney, Agent, or Firm* — Grossman, Tucker, Perreault & Pfleger, PLLC

(57) ABSTRACT

One embodiment provides a method for receiving subnet administration (SA) data using a remote direct memory access (RDMA) transfer. The method includes formatting, by a network node element, an SA data query with an RDMA-capable flag; configuring, by the network node element, a reliably-connected queue pair (RCQP) to receive an RDMA transfer from a subnet manager in communication with the network node element on an RDMA-capable network; and allocating, by the network node element, an RDMA write target buffer to receive the SA data using an RDMA transfer from the subnet manager in response to the SA data query.

31 Claims, 5 Drawing Sheets

EFFICIENT DISTRIBUTION OF SUBNET ADMINISTRATION DATA OVER AN RDMA NETWORK

This application claims priority to International Application No. PCT/US2012/031357 filed Mar. 30, 2012, the entire content of which is herein incorporated by reference.

FIELD

The present disclosure relates to efficient distribution of subnet administration data over an RDMA network.

BACKGROUND

RDMA-capable networks, like an Infiniband™ network, are managed by a subnet manager (SM). The SM is responsible for discovering and configuring devices connected to the network. On request, the SM can distribute such configuration data to applications, which use it to establish communication between nodes on the network. The Infiniband™ protocol defines an unreliable datagram communications protocol to enable the SM to send configuration data to one or more nodes on the network. However, unreliable datagram communications protocol requires software error checking procedures which can significantly impact throughput, and thus, unreliable datagram communications protocol is ill-suited to provide high-speed scalability, performance and fault tolerance on RDMA-capable networks like Infiniband™ networks.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure relates to efficient, scalable distribution of subnet administration data over an RDMA-capable network, such as an Infiniband™ network. A subnet manager, generally configured for network device discovery and generating subnet administration (SA) data, publishes a reliable connection queue pair to at least one network node element. The reliable connection queue pair enables, among other things, an RDMA transfer between the subnet manager and the network node element, instead of using unreliable datagram queue pairs conventionally defined by the RDMA-capable network communications protocol. Applications executed on the network node element may require the SA data to communicate with, for example, other network node elements. The network node element may configure the reliable connection queue pair and an RDMA write target buffer, send an SA data query to the subnet manager and receive, via an RDMA transfer on the reliable connection queue pair, the SA data. The size of the SA data is typically large enough such that unreliable datagram transfers may significantly impact overall system throughput and performance. In contrast, an RDMA transfer according to the teaching presented herein may offer significant speed advantages over conventional approaches, and may also advantageously utilize more robust error checking techniques (e.g., hardware-based error checking protocols) to offer further increased efficiency and throughput.

Figure 1:
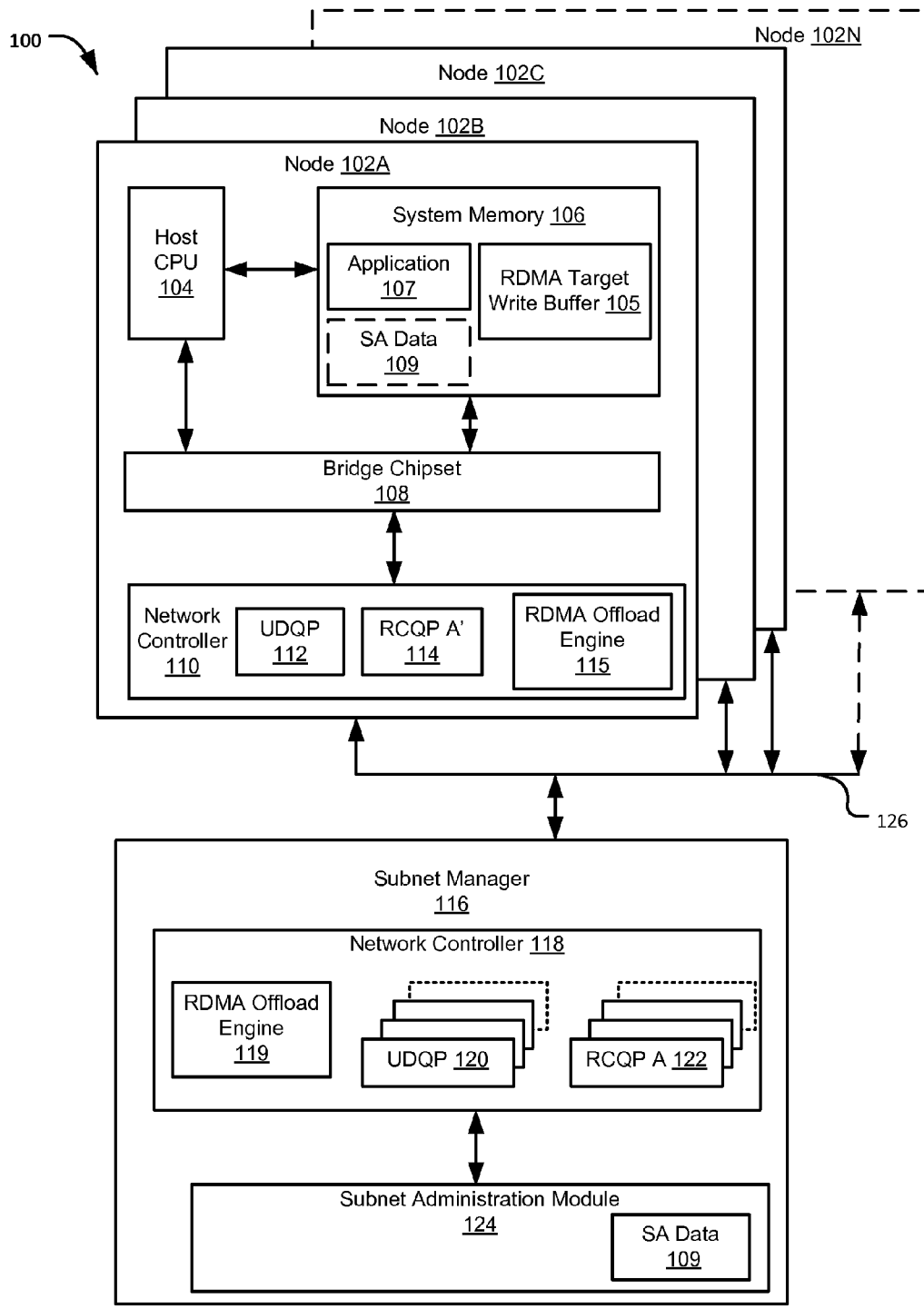
FIG. 1 illustrates a network system consistent with various embodiments of the present disclosure.

FIG. 1 illustrates a network system 100 consistent with various embodiments of the present disclosure. Network system 100 generally includes a plurality of network node elements 102A, 102B, 102C, . . . , 102N and a subnet manager (SM) 116, each configured to communicate with one another via network fabric 126. Each network node element 102A, 102B, 102C, . . . , 102N and the SM 116 may communicate with each other, via network 126, using an remote direct memory access-capable (RDMA-capable) communications protocol. As used herein, an RDMA-capable communications protocol is a communications protocol that enables RDMA data transfers between network node elements and/or between network node elements and the SM 116. In one exemplary embodiment, the RDMA-capable communications protocol is the Infiniband™ communications protocol. Each node element 102A, 102B, 102C, . . . , 102N may represent a computer node element (e.g., host server system), switch, and/or network storage device. Taking node 102A as an example of a host, or server system node, the node 102A generally includes a host processor, host CPU 104, a system memory 106, a bridge chipset 108, and a network controller 110. The host CPU 104 is coupled to the system memory 106 and the bridge chipset 108. The network controller 110 is configured to communicate with other network node elements and the SM 116 using the RDMA-capable communications protocol. The network controller 110 is configured to generate and utilize queue pairs (e.g., transmit/receive queue pairs) to enable messaging and I/O transactions with other nodes in the network system 100, as may be defined by the RDMA-capable communications protocol.

In at least one exemplary system, the network controller 110 is configured to define at least one unreliable datagram queue pair 112 (UDQP 112) and at least one reliable connection queue pair (RCQP 114. An RCQP, as used herein, may be an RDMA-capable queue pair that is capable of sending or receiving data packets using an RDMA transfer. Further, network controller 110 may include RDMA offload engine circuitry 115 that is configured to provide, for example, packet transport, packet segmentation, packet reassembly, error checking, transmission acknowledgements, transmission retries, etc., without the need for host CPU 104 and/or software involvement. Thus, packets received on the RCQP 114 may utilize the RDMA offload engine circuitry 115 to provide an RDMA transfer without host CPU 104 and/or software involvement. The RCQP may be connection-oriented, and may support very large data transfers, on the order of gigabytes. RCQPs may be used according to the teachings herein to transfer most application data, where correct delivery of the data is desired (e.g. simulation results, images, file transfers, etc.). A UDQP, as used herein, is generally defined as a queue pair that supports data packet transfers using an unreliable datagram messaging, as may be defined by the Infiniband™ communications protocol. Such unreliable datagram messaging generally does not utilize the RDMA offload engine circuitry 115, rather, packet transport, packet segmentation, packet reassembly, error checking, transmission acknowledgements, transmission retries, etc., are performed using the host CPU 104 and software (not shown). A UDQP is generally provided to transfer small packets between nodes. Datagrams are generally limited in size to the maximum transfer unit of a network link layer (not shown), typically 4 KB or smaller on Infiniband™networks, In additions, datagrams may include the full address information of a destination, and are not typically acknowledged by hardware. Thus, for messages sent and received on a UDQP, software must handle large message segmentation and reassembly, packet loss, errors, timeouts, out of order data, and retransmissions. A single UDQP may send and receive data to and from multiple remote nodes. UDQPs may be useful when communicating a small amount of data with multiple nodes, or if the data does not necessarily need to be received (e.g. voice data, positional information, some types of video). Of course, node 102A may also include storage controller circuitry (not shown) which may be coupled to one or more storage devices (not shown) that form part of an Infiniband™ network fabric. Other network node elements 102B, 102C, . . . , 102N may be similarly configured as node 102A to the extent such a configuration enables the other network node elements 102B, 102C, . . . , 102N to communicate over the network fabric using the RDMA-capable communications protocol.

The system memory 106 is configured to store at least one application 107 and subnet administration (SA) data 109. In addition, system memory 106 may be controlled to provide an RDMA target write buffer 105 to enable an RDMA transfer from the SM 116 to the node, as will be described in detail below. In one example, the application 107 may be stored in system memory 106 (which may include, for example, system RAM and/or cache memory) and executed, at least in part, by host CPU 104. The application 107 may include instructions that initiate communication, via network controller 110, with one or more nodes 102B, . . . , 102N and/or with the SM 116. Sample applications that may be utilized with the present disclosure include, for example, those which make use of MPI (message passing interface): for example, chemical modeling, crash simulations, oil and energy exploration, stock modeling, aerodynamics, etc. To enable communication among the nodes in the network system 100, the application 107 may utilize system administration data 109 (SA data). The SA data 109 may include, for example, address and path information for the members of the network fabric. The SA data 109 may be generated by the SM 116, and the node 102A may query the SM 116 for the SA data 109 when an application 107 is executed. Typically, the SA data 109 on Nodes 102A-N is "short-lived", meaning that once the SA data 109 is utilized by a given application 107 to communicate among nodes in the network fabric, subsequent application execution includes a query to the SM 116 to refresh the SA data 109 from the SM 116.

The SM 116 may be generally configured in a similar manner as network node element 102A, but the SM 116 is generally designated as the "master node" that governs the communication rules and policies of the network system 100. The SM 116 includes a network controller 118 that, similar to network controller 110, is configured to communicate with the network node elements and the SM 116 using the RDMA-capable communications protocol. In at least one exemplary system, the network controller 118 is configured to define at least one unreliable datagram queue pair 112 (UDQP 120) and at least one reliable connection queue pair (RCQP 122). The network controller may also include RDMA offload circuitry 119 that is configured similarly to RDMA offload engine 115, described above. The SM 116 also includes a subnet administration module 124 that is generally operable to configure the network fabric (which may include, for example, device/node element discovery, determination of device/node element capabilities and configuration, etc.), assign addresses to nodes and/or nodes and network controllers, program node switch elements to provide paths between node elements. The subnet administration module 124 is also configured to generate the SA data 109, and the SA data 109 generally includes address and path information for the network node elements 102A, 102B, 102C, . . . , 102N in the network system 100.

The conventional Infiniband™ communications protocol specifies that packet transactions between the SM 116 and the network node elements 102A, 102B, 102C, . . . , 102N are to be performed using an unreliable datagram queue pair, e.g., between UDQP 114 and UDQP 120. Specifically, the Infiniband™ communications protocol typically specifies UDQP1 for such communications. The network controller 118 is configured to assign at least one UDQP 120 that is used for communication with at least one network node element. Likewise, and using node 102A as an example, the network controller 110 is configured to assign a corresponding UDQP 112 to provide unreliable datagram communications between controller 118 and controller 110. In the conventional Infiniband™ communications protocol, a query response from the SM 116 to the network node element 102A is communicated using the UDQP 120 and UDQP 112. Thus, in the conventional Infiniband™ communications protocol, an SA data response that includes the SA data 109 is performed using an unreliable datagram transmission using the corresponding UPDQ 120 and UPQP 112. However, an unreliable datagram packet transmission typically utilizes software for segmentation, reassembly, acknowledgements, and, if applicable, transmission retries if the packet transmission fails. The SA data 109 may be relatively large (e.g., 2-3 MB for a typically-sized network) and, since an application 107 typically requires an SA data refresh for each execution, such software utilization generally and significantly limits the overall throughput of the network system and may also significantly impact the scalability of the network system.

In at least one embodiment of the present disclosure, the network controller 118 is also configured to assign reliable connected queue pair (RCQP) 122 to enable the network controller 118 to transfer query responses to at least one node element 102A, 102B, 102C, . . . , 102N using an RDMA transfer. Network controller 118 may assign more than one RCQP for a given network node element, and multiple RCQP's may be assigned for a plurality of network node elements to enable, for example, parallel RDMA transfers between the SM 116 and a plurality of network node elements 102A, 102B, 102C, . . . , 102N. In the example of FIG. 1, a plurality of RCQP's may be assigned, one for each of a plurality of network node elements (e.g., RCQP A 122 is assigned to node 102A, etc.). The SM 116 is configured to publish the assignment of an RCQP to at least one network node element. Using node 102A as an example, upon receipt of a publication of an RCQP from the SM 116 and upon execution of an application 107, the network controller 110 is configured to assign a corresponding RCQP A' 114 to enable an RDMA transfer between controller 118 and controller 110. In addition, once enabled for RDMA transfers, the node 102A may be configured to assign an RDMA write target buffer 105 to provide a storage location for a direct memory write from the SM 116 to the node 102A. These concepts are described in greater detail below.

Figure 2:
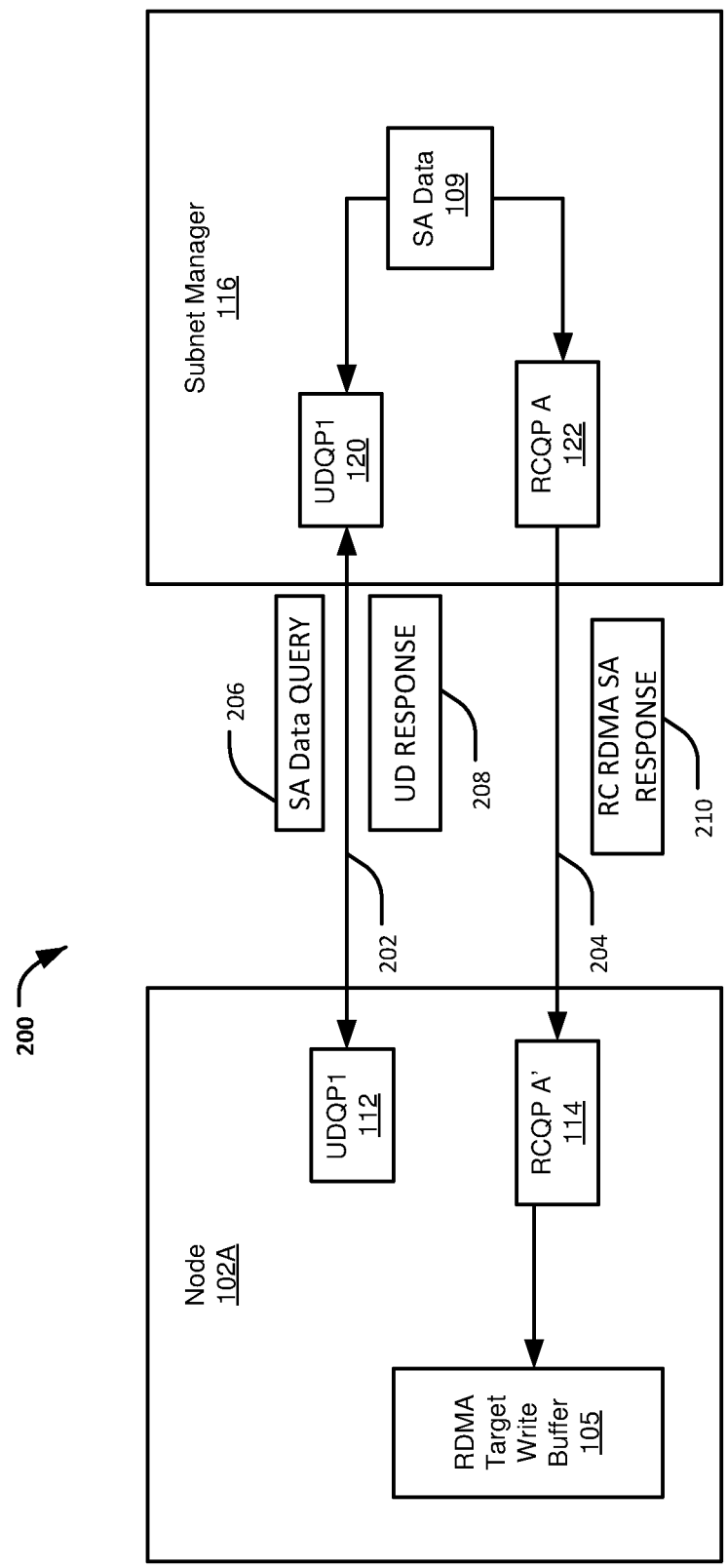
FIG. 2 illustrates in more detail communication between a node and a subnet manager of FIG. 1.

FIG. 2 is a block diagram 200 illustrating in more detail communication operations between node 102A and the SM 116 of FIG. 1. In this example, an unreliable datagram communication channel 202 and a reliable connected communication channel 204 is depicted as providing communication between the node 102A and the SM 116. It should be realized, however, the channels 202 and 204 are depicted in this figure as logical connections, not necessarily separate physical communication channels. In operation, in response to execution of an application (107), an SA data query 206 may be sent by the node 102A to the SM 116 using an unreliable datagram transmission using the corresponding UPDQ1 120 and UPQP1 112. The SA data query 206 may comply with a query specification defined in the Infiniband™ communications protocol, and the query may include a "reserved" data field (e.g., one or more specified bits that are specified but unused in the Infiniband™ communications protocol). As part of the management over the rules and policies of the network fabric, the SM 116 may specify a certain bit (or bits) in the reserved data field of the SA data query 206 to indicate that RDMA transfers are accepted (RDMA-capable flag). Thus, if node 102A is configured for, and capable of, receiving RDMA transfers from the SM 116, the node 102A may format the SA data query 206 with an RDMA-capable flag in the reserved data field.

The node 102A may also be capable of allocating an RDMA write target buffer 105 to receive and store an RDMA response from the SM 116. The node 102A may update the SA data query 206 with RDMA write target buffer address, encryption key, and/or buffer length information. In response to the SA data query 206, the SM 116 may determine if the SA data 109 may be sent as a reliable connected RDMA SA data response (RC RDMA SA response 210) or as an unreliable datagram response (UD Response 208). For example, the SM 116 may be configured to determine if the size of the RDMA write buffer is appropriate for the response or if the RCQP 122 is busy (or otherwise unavailable) such that an RDMA transfer cannot proceed. The SM 116 may send a response to the SA data query 206 using an unreliable datagram transmission (UD Response 208) using the corresponding UPDQ1 120 and UPQP1 112. The UD response 208 may include instructions to re-allocate the RDMA target write buffer 105 to a specific size, to redirect the RDMA response to another RCQP, and/or other instructions. Node 102A may, after receiving the UD response 208, resend an SA data query 206 to the SM 116. If the capabilities of the node 102A and the SM 116 support an RDMA transfer, the SM 116 may send the RC RDMA SA response 210 which includes the SA data 109. In contrast to the conventional approach, however, the SM 116 may send an SA data response that includes the SA data 109 using a reliable connected transmission using the corresponding RCQP A 122 and RCQP A' 114. Once the response is received in the RCQP A' 114, the response data may be stored directly in the RDMA target write buffer 105 using an RDMA transfer, thus avoiding intervening data write operations. The reliable connection transmission using RCQP A 122 and RCQP A' 114 may utilize hardware (e.g., RDMA offload engine circuitry 115) for segmentation, reassembly, acknowledgements, and, if applicable, transmission retries if the packet transmission fails. Thus, significant improvements in the overall throughput and scalability of the network system may be realized.

Figure 3:
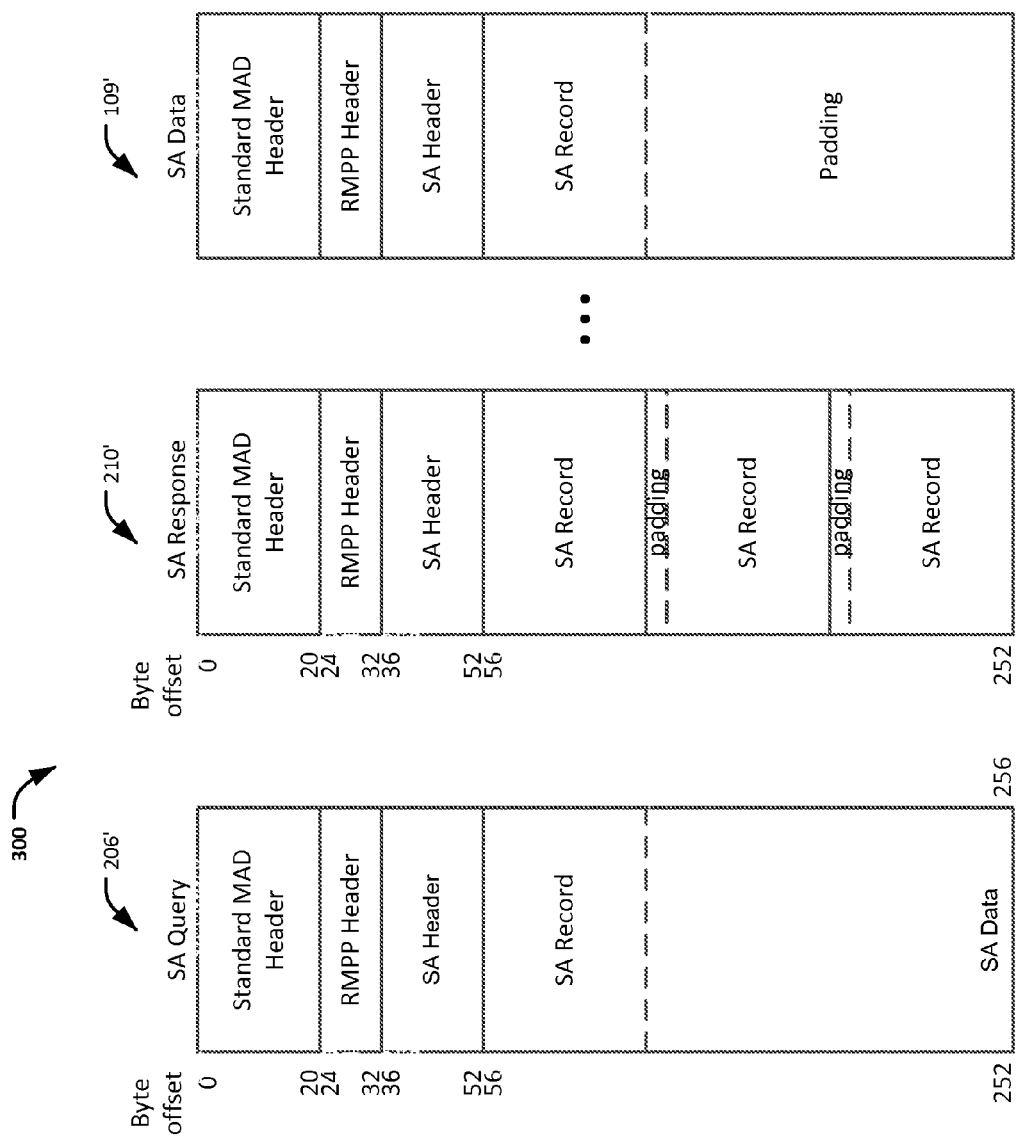
FIG. 3 illustrates exemplary Infiniband™ message structures of an SA data query, SA response and SA data according to one embodiment of the present disclosure.

FIG. 3 illustrates exemplary Infiniband™ message structures of an SA data query 206', SA response 210' and SA data 109' according to one embodiment of the present disclosure. The byte offset for each of the messages (noted along the left edge of each message) represents typically offset information for various fields within a message using the Infiniband™ protocol. The SA data query 206' may include a standard MAD (management datagram) portion, an RMPP (reliable multi-packet processing) header portion, an SA header, an SA record and SA data portions. The SA header may include one or more reserved fields which may include the RDMA-capable flag. The RMPP header includes information to enable the offload engine to handle packet segmentation and reassembly. There are various types of SA data. These are defined as 'records'. Each record describes different types of information about the network or nodes on the network. Exemplary records include, for example, a record that describes information about a switch, one that describes node information, records for performance counters, etc. The records are the actual data that is being requested. The headers are used to identify the queries and responses, so that a response can be matched with the correct query. Thus, the MAD header is used to match a response with a query and identifies which service a query is for. And the SA header identifies which record the user is looking for. The SA header may be present when the MAD header indicates that the query should be directed to the SA. The SA data area contains the actual input and output to the query. Each of these portions may also be included with SA response 210' and SA data 109', as depicted in FIG. 3. Of course, any of the messages shown in FIG. 3 may also include "padding" portions and/or control MADs used for acknowledgement purposes (control MADs may have the same format as those that are shown, but typically do not carry SA records) and/or other portions/fields that may be specified by the Infiniband™ protocol.

Figure 4:
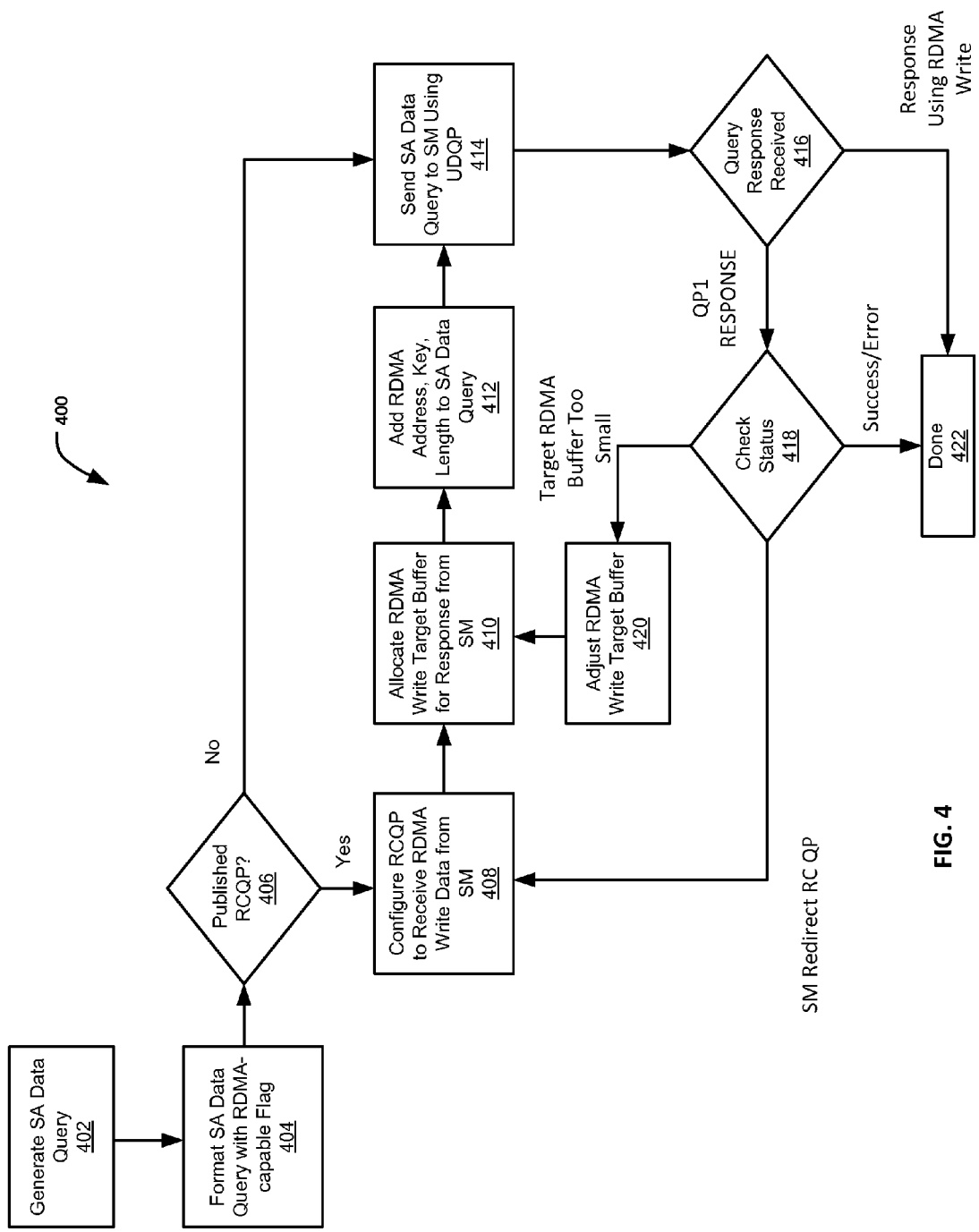
FIG. 4 is a flowchart of operations according to one embodiment of the present disclosure.

FIG. 4 is a flowchart 400 of operations according to one embodiment of the present disclosure. In particular, the flowchart 400 illustrates operations of a network node element to enable an RDMA transfer of SA data from a subnet manager to the network node element. Operations of this embodiment include generating an SA data query 402. The SA data query may be generated, for example, by an application being executed on the network node element. The application may use the SA data, for example, to communicate with another network node element to facilitate an I/O transaction (e.g., data read, data write, etc.) between the network node elements, and thus, the SA data may include, for example, the address of the other network node element. Operations may also include formatting, by the first network node element, the SA data query with an RDMA-capable flag 404. The RDMA-capable flag may include, for example, a bit (or bits) that are set within a reserved data field of an Infiniband™ data query header. Operations of this embodiment may also include determining if the subnet manager (SM) has published an RC queue pair to the network node element 406, to enable RDMA transfers from the SM to the network node element. The SM may also configure a corresponding RCQP that is dedicated for transfers to the RCQP of the network node element.

If the SM has published an RCQP, operations of this embodiment may also include configuring the RCQP to receive RDMA write data from the SM 408. The configuration of the RCQP is accomplished by programming the RCQP with the remote RCQP address information (e.g., QP number, network address, and quality of service information), sequence numbers, timeout values, etc. The RCQP may also be transitioned through its internal states until it is ready to send to a remote RCQP. Operations of this embodiment may also include allocating an RDMA write target buffer to receive the response from the SM 410. Here, the response from the SM may include the SA data and the RDMA write target buffer may receive the response via an RDMA transfer. Operations may further include adding RDMA buffer address, encryption key, and/or buffer length information to the SA data query 412. Since the RCQP may be enabled for one-way communication from the SM to the network node element, operations of this embodiment may also include sending the SA data query to the SM using an unreliable datagram queue pair (UDQP) 414. The UDQP may include, for example, a queue pair that is predefined for a given RDMA communications protocol, for example queue pair 1 for the Infiniband™ protocol. At operation 416, the network node element may determine if an SA data query response has been sent from the subnet manager, and whether the response is received on the RCQP or the UDQP. If the response received on RCQP is the requested SA data from the subnet manager, the network node element may respond by transferring the data from the designated RCQP into the configured RDMA write target buffer using an RDMA transfer, thus completing the transaction 422.

However, if a response from the subnet manager is received on the UDQP, this may cause the network node element to check the status of the response 418. In one example, a response, sent by the subnet administrator may be a status response that indicates that the size of the RDMA write target buffer is too small for the intended RDMA transfer. The network node element may respond, at operation 420, by adjusting the size of the RDMA write target buffer by re-allocating the RDMA write target buffer to receive the response from the subnet manager 410. Operations 412 and 414, described above, may be repeated and if an SA data query response is sent from the subnet manager 416, the transaction may be completed 422. In another example, a response, sent by the subnet administrator may be a redirect response that indicates that the configured RCQP is no longer valid, and that the response from the subnet manager is to be redirected to a second RCQP. An invalid RCQP may indicate, for example, that the current, previously-published RCQP is busy or otherwise unusable for the SA data transfer. The network node element may respond, at operation 408, by configuring a second RCQP to receive the response from the subnet manager. Operation 410 (to the extent a re-allocation of the RDMA write target buffer is specified) and operations 412 and 414, described above, may be repeated and if an SA data query response is sent from the subnet manager 416, the transaction may be completed 422.

Referring back to operation 406, if the RCQP has not been published by the subnet manager, this may indicate that the subnet manager is incapable of providing an RDMA response to an SA data query (such as may be the case for legacy systems, etc.). In this case, the network node element may send the SA data query to the subnet manager using the unreliable datagram queue pair (UDQP) 414. The network node element may determine if an SA data query response has been sent from the subnet manager, and received on the UDQP (operation 416). The response received on UDQP1 may include the SA data. The network node element may check the status of the response 418, and if the response passes the status check, the transaction may be completed 422.

Figure 5:
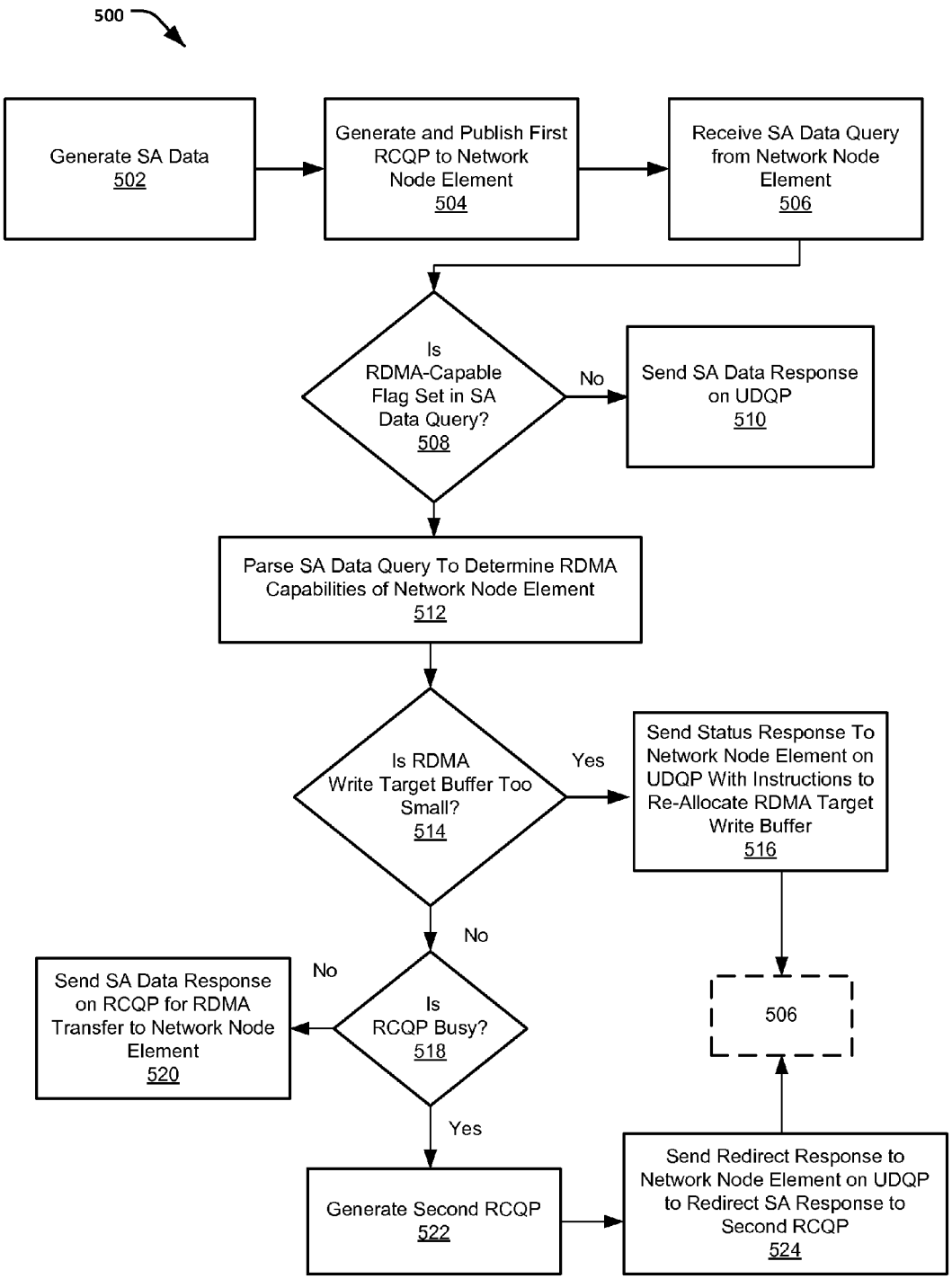
FIG. 5 is a flowchart of operations according to another embodiment of the present disclosure.

FIG. 5 is a flowchart 500 of operations according to another embodiment of the present disclosure. In particular, the flowchart 500 illustrates operations of a subnet manager (SM) to enable an RDMA transfer of SA data from the SM to a network node element. Operations of this embodiment include generating SA data 502. The SA data, as noted above, may include address and path information of at least one network node element in an Infiniband™ network fabric. Operations also include generating and publishing a first RCQP to a network node element 404. Operations also include receiving, by the SM from the network node element, an SA data query 506. Operations also include determining if an RDMA-capable flag is set in the SA data query 508. If not, operations include sending the SA data response on a UDQP 510.

If an RDMA-capable flag is set (508), operations may also include parsing the SA data query to determine the RDMA capabilities of the network node element 512. Operations may also include determining if the RDMA write target buffer is too small to receive the SA data 514. If the RDMA write target buffer is too small, operations may also include sending a status response to the network node element on a UDQP to re-allocate the RDMA write target buffer 516. Operation 506 may be repeated (noted in the broken line box 506) with the re-allocated DMA write target buffer. If the RDMA write target buffer is appropriately sized to receive the SA data by an RDMA transfer, operations may also include determining if the RCQP is unavailable 518. If the RCQP is available, operations may include sending an SA data response on the RCQP for an RDMA transfer to the network node element 520. The SA data may be written into the RDMA write target buffer directly from the RCQP associated with the network node element. If the RCQP is unavailable, operations may include generating a second RCQP 522 and sending a redirect response to the network node element on the UDQP to redirect the SA response to the second RCQP 524. Operation 506 may be repeated (noted in the broken line box 506) with the second RCQP.

While the flowcharts of FIG. 4 and FIG. 5 illustrate operations according various embodiments, it is to be understood that not all of the operations depicted in FIG. 4 and/or FIG. 5 are necessary for other embodiments. In addition, it is fully contemplated herein that in other embodiments of the present disclosure, the operations depicted in FIG. 4, FIG. 5 and/or other operations described herein may be combined in a manner not specifically shown in any of the drawings, and such embodiments may include less or more operations than are illustrated in FIG. 4 and/or FIG. 5. Thus, claims directed to features and/or operations that are not exactly shown in one drawing are deemed within the scope and content of the present disclosure.

The foregoing is prided as exemplary system architectures and methodologies, modifications to the present disclosure are possible. For example, node 102A may further include an operating system (OS, not shown) to manage system resources and control tasks that are run on, e.g., node 102A. For example, the OS may be implemented using Microsoft Windows, HP-UX, Linux, or UNIX, although other operating systems may be used. In some embodiments, the OS may be replaced by a virtual machine which may provide a layer of abstraction for underlying hardware to various operating systems running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated subsystem such as, for example, a TCP offload engine and/or network controller 110.

System memory, e.g., system memory 106 and/or memory associated with the network controller, e.g., network controller 110, 118 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory 106 and/or memory associated with network controller 110, 118 may comprise other and/or later-developed types of computer-readable memory.

Embodiments of the operations described herein may be implemented in a system that includes one or more storage mediums having stored thereon, individually or in combination, instructions that when executed by one or more processors perform the methods. The processor may include, for example, a processing unit and/or programmable circuitry in the network controller 110, 118 and/or the host CPU 104 and/or other processing unit or programmable circuitry. Thus, it is intended that operations according to the methods described herein may be distributed across a plurality of physical devices, such as processing structures at several different physical locations. The storage medium may include any type of tangible, non-transitory storage medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage media suitable for storing electronic instructions.

The network system 100 depicted in FIG. 1 may integrate with, or form part of, an enterprise network system such as an enterprise mass storage system, enterprise data centers, etc. Such a network system may be configured to communicate with other network systems via, for example, a packet switched network (this may include, for example, cloud computing, cloud storage, etc.). Thus, the network controller 110 and/or 118 (and/or other network controllers associated with other network node elements) may be configured to communicate using a packet switched communications protocol, for example, an Ethernet communications protocol. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard.

The InfiniBand™ communications protocol may comply or be compatible with the InfiniBand specification published by the InfiniBand Trade Association (IBTA), titled "InfiniBand Architecture Specification", published in June, 2001, and/or later versions of this specification. In the examples described above, the RDMA-capable network is an Infiniband™ network. In other embodiments, other RDMA-capable network protocols may be used, for example an iWARP communications protocol. The iWARP communications protocol may comply or be compatible with the iWARP standard developed by the RDMA Consortium and maintained and published by the Internet Engineering Task Force (IETF), titled "RDMA over Transmission Control Protocol (TCP) standard", published in 2007 and/or later versions of this standard.

"Circuitry", as used in any embodiment herein, may comprise, for example, singly or in any combination, hard-wired circuitry, programmable circuitry, state machine circuitry, and/or firmware that stores instructions executed by programmable circuitry. "Module", as used herein, may comprise, singly or in any combination circuitry and/or instructions sets (e.g., software, firmware, etc.).

Accordingly, the present disclosure provides an example network node element that includes a network controller configured to communicate with a subnet administrator using a remote direct memory access (RDMA)-capable communications protocol on an RDMA-capable network; a processor configured to execute an application, wherein the application is configured to generate a subnet administration (SA) data query to request SA data from the subnet administrator, and wherein the SA data includes address and path information; and a memory for storing the application. Upon execution of the application, the processor is further configured to format the SA data query with an RDMA-capable flag. Upon execution of the application, the network controller is further configured to configure a reliable-connected queue pair (RCQP) to receive an RDMA transfer from a subnet manager; and allocate an RDMA write target buffer to receive the SA data using an RDMA transfer from the subnet manager in response to the SA data query.

Another example network node element includes the forgoing and further defines that the processor is further configured to add, to the SA data query, address, encryption key and buffer length information concerning the RDMA write target buffer.

Another example network node element includes the forgoing and further defines that the network controller is further configured to receive an SA data response on the RCQP and store the SA data response in the RDMA write target buffer; wherein the SA data response comprises the SA data.

Another example network node element includes the forgoing and further defines that the network controller is further configured to configure a predetermined unreliable datagram (UD) queue pair and send the SA data query to the subnet manager using a predetermined unreliable datagram (UD) queue pair.

Another example network node element includes the forgoing and further defines that the network controller is further configured to receive a status response from the subnet manager in response to the SA data query; wherein the status response is indicative that the size of the RDMA write target buffer is too small to accommodate the SA data.

Another example network node element includes the forgoing and further defines that the network controller is further configured to re-allocate the RDMA write target buffer having a size that is capable of accommodating the SA data.

Another example network node element includes the forgoing and further defines that the network controller is further configured to receive a redirect response from the subnet manager in response to the SA data query; wherein the redirect response is indicative that the RCQP is invalid and that the response to the SA data query is redirected to a second RCQP.

Another example network node element includes the forgoing and further defines that the network controller is further configured to configure the second RCQP to receive the RDMA transfer from a subnet manager.

Another example network node element includes the forgoing and further defines that the SA data query comprises a query having at least one reserved data field defined by an RDMA communications protocol, and wherein the RDMA-capable flag comprises an indicator, in the reserved data field, that the network node element is capable of receiving an RDMA transfer from the subnet manager.

The present disclosure also provides a subnet manager that includes a network controller configured to communicate with at least one network node element using a remote direct memory access (RDMA)-capable communications protocol on an RDMA-capable network; and a subnet administration module configured to assign an address and path information for the at least one network node element, and further configured to generate a subnet administration (SA) data the includes the address and path information. The network controller is further configured to configure a reliable-connected queue pair (RCQP) to send an RDMA transfer to the at least one network node element; publish the RCQP to the at least one network node element to cause the at least one network node element to configure a complementary RCQP; receive an SA data query from the at least one network node element; and send, using the RCQP and the complementary RCQP, an SA data response that includes the SA data to the at least one network node element using an RDMA transfer.

Another example subnet manager includes the foregoing and further defines that the network controller is further configured to determine if an RDMA write target buffer, associated with the at least one network node element, is too small to accommodate the SA data using the RDMA transfer.

Another example subnet manager includes the foregoing and further defines that the network controller is further configured to generate a status response from the subnet manager in response to the SA data query and send the status response to the network node element; wherein the status response is indicative that the size of the RDMA write target buffer is too small to accommodate the SA data.

Another example subnet manager includes the foregoing and further defines that the network controller is further configured to determine if the RCQP is unavailable.

Another example subnet manager includes the foregoing and further defines that the network controller is further configured to generate a second RCQP and send a redirect response to the network node element; wherein the redirect response is indicative that the RCQP is unavailable and that the response to the SA data query is redirected to a second RCQP.

The present disclosure also provides a system that includes a network node element configured to communicate using a remote direct memory access (RDMA)-capable communications protocol on an RDMA-capable network; and a subnet manager configured to communicate with the network node element using the RDMA-capable communications protocol communication on the RDMA-capable network, and configured to generate subnet administration (SA) data including address and path information for at least one network node element on the RDMA-capable network. The network node element is further configured to format an SA data query with an RDMA-capable flag; and allocate an RDMA write target buffer to receive the SA data using an RDMA transfer from the subnet manager in response to the SA data query. The subnet manager is further configured to configure a reliable-connected queue pair (RCQP) to send an RDMA transfer to the network node element; publish the RCQP to the network node element to cause the at least one network node element to configure a complementary RCQP; receive an SA data query from the at least one network node element; and send, using the RCQP and the complementary RCQP, an SA data response that includes the SA data to the network node element using an RDMA transfer.

Another example system includes the foregoing and further defines that the network node element is further configured to add, to the SA data query, address, encryption key and buffer length information concerning the RDMA write target buffer.

Another example system includes the foregoing and further defines that the network node element is further configured to receive a status response from the subnet manager in response to the SA data query; wherein the status response is indicative that the size of the RDMA write target buffer is too small to accommodate the SA data.

Another example system includes the foregoing and further defines that the network node element is further configured to re-allocate the RDMA write target buffer having a size that is capable of accommodating the SA data.

Another example system includes the foregoing and further defines that the network node element is further configured to receive a redirect response from the subnet manager in response to the SA data query; wherein the redirect response is indicative that the RCQP is invalid and that the response to the SA data query is redirected to a second RCQP.

Another example system includes the foregoing and further defines that the network node element is further configured to configure the second RCQP to receive the RDMA transfer from a subnet manager.

Another example system includes the foregoing and further defines that the SA data query comprises a query having at least one reserved data field defined by the RDMA-capable communications protocol, and wherein the RDMA-capable flag comprises an indicator, in the reserved data field, that the network node element is capable of receiving an RDMA transfer from the subnet manager.

The present disclosure also provides a method that includes formatting, by a network node element, an SA data query with an RDMA-capable flag; configuring, by the network node element, a reliably-connected queue pair (RCQP) to receive an RDMA transfer from a subnet manager in communication with the network node element on an RDMA-capable network; and allocating, by the network node element, an RDMA write target buffer to receive the SA data using an RDMA transfer from the subnet manager in response to the SA data query.

Another example method includes the foregoing operations and further includes adding, to the SA data query by the network node element, address, encryption key and buffer length information concerning the RDMA write target buffer.

Another example method includes the foregoing operations and further defines that the SA data comprises address information of at least one network node element of the RDMA-capable network.

Another example method includes the foregoing operations and further includes receiving, by the network node element, an SA data response on the RCQP and storing the SA data response in the RDMA write target buffer; wherein the SA data response comprises the SA data.

Another example method includes the foregoing operations and further includes sending, by the network node element, the SA data query to the subnet manager using a predetermined unreliable datagram (UD) queue pair.

Another example method includes the foregoing operations and further includes receiving, by the network node element, a status response from the subnet manager in response to the SA data query; wherein the status response is indicative that the size of the RDMA write target buffer is too small to accommodate the SA data.

Another example method includes the foregoing operations and further includes re-allocating the RDMA write target buffer having a size that is capable of accommodating the SA data.

Another example method includes the foregoing operations and further includes receiving, by the network node element, a redirect response from the subnet manager in response to the SA data query; wherein the redirect response is indicative that the RCQP is invalid and that the response to the SA data query is redirected to a second RCQP.

Another example method includes the foregoing operations and further includes configuring, by the network node element, the second RCQP to receive the RDMA transfer from a subnet manager.

Another example method includes the foregoing operations and further defines that the SA data query comprises a query having at least one reserved data field defined by an RDMA communications protocol, and wherein the RDMA-capable flag comprises an indicator, in the reserved data field, that the network node element is capable of receiving an RDMA transfer from the subnet manager.

The present disclosure also provides a system that is configured to perform any of the foregoing operations of the example method. The system includes one or more storage mediums having stored thereon, individually or in combination, instructions that when executed by one or more processors result in the following operations that include any of the foregoing operations of the example method.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A network node element, comprising:
   a network controller configured to communicate with a subnet administrator using a remote direct memory access (RDMA)-capable communications protocol on an RDMA-capable network;
   a processor configured to execute an application, wherein the application is configured to generate a subnet administration (SA) data query to request SA data from the subnet administrator, and wherein the SA data includes address and path information; and
   a memory for storing the application;
   wherein, upon execution of the application, the processor is further configured to:
      format the SA data query with an RDMA-capable flag; and wherein, upon execution of the application, the network controller is further configured to:
      configure a reliable-connected queue pair (RCQP) to receive an RDMA transfer from a subnet manager; and
      allocate an RDMA write target buffer to receive the SA data using an RDMA transfer from the subnet manager in response to the SA data query.

2. The network node element of claim 1, wherein the processor is further configured to add, to the SA data query, address, encryption key and buffer length information concerning the RDMA write target buffer.

3. The network node element of claim 1, wherein the network controller is further configured to receive an SA data response on the RCQP and store the SA data response in the RDMA write target buffer; wherein the SA data response comprises the SA data.

4. The network node element of claim 1, wherein the network controller is further configured to configure a predetermined unreliable datagram (UD) queue pair and send the SA data query to the subnet manager using a predetermined unreliable datagram (UD) queue pair.

5. The network node element of claim 1, wherein the network controller is further configured to receive a status response from the subnet manager in response to the SA data query; wherein the status response is indicative that a size of the RDMA write target buffer is not capable of accommodating the SA data.

6. The network node element of claim 5, wherein the network controller is further configured to re-allocate the RDMA write target buffer having a size that is capable of accommodating the SA data.

7. The network node element of claim 1, wherein the network controller is further configured to receive a redirect response from the subnet manager in response to the SA data query; wherein the redirect response is indicative that the RCQP is invalid and that a response to the SA data query is redirected to a second RCQP.

8. The network node element of claim 7, wherein the network controller is further configured to configure the second RCQP to receive the RDMA transfer from the subnet manager.

9. The network node element of claim 1, wherein the SA data query comprises a query having at least one reserved data field defined by an RDMA communications protocol, and wherein the RDMA-capable flag comprises an indicator, in the at least one reserved data field, that the network node element is capable of receiving the RDMA transfer from the subnet manager.

10. A subnet manager, comprising:
   a network controller configured to communicate with at least one network node element using a remote direct memory access (RDMA)-capable communications protocol on an RDMA- capable network; and
   subnet administration circuitry configured to assign an address and path information for the at least one network node element, and further configured to generate a subnet administration (SA) data that includes the address and the path information;
   wherein the network controller is further configured to:
      configure a reliable-connected queue pair (RCQP) to send an RDMA transfer to the at least one network node element;

publish the RCQP to the at least one network node element to cause the at least one network node element to configure a complementary RCQP;

receive an SA data query from the at least one network node element;

determine whether an RDMA-capable flag is set in the SA data query; and based on the determination that the RDMA-capable flag is set, send, using the RCQP and the complementary RCQP, an SA data response that includes the SA data to the at least one network node element using an RDMA transfer.

11. The subnet manager of claim 10, wherein the network controller is further configured to determine if an RDMA write target buffer, associated with the at least one network node element, is not capable of accommodating the SA data using the RDMA transfer.

12. The subnet manager of claim 11, wherein the network controller is further configured to generate a status response from the subnet manager in response to the SA data query and send the status response to the at least one network node element; wherein the status response is indicative that a size of the RDMA write target buffer is not capable of accommodating the SA data.

13. The subnet manager of claim 10, wherein the network controller is further configured to determine if the RCQP is unavailable.

14. The subnet manager of claim 13, wherein the network controller is further configured to generate a second RCQP and send a redirect response to the at least one network node element; wherein the redirect response is indicative that the RCQP is unavailable and that the SA data response is redirected to the second RCQP.

15. A system comprising:
at least one network node element configured to communicate using a remote direct memory access (RDMA)-capable communications protocol on an RDMA-capable network; and
a subnet manager configured to communicate with the at least one network node element using the RDMA-capable communications protocol on the RDMA-capable network, and configured to generate subnet administration (SA) data including address and path information for the at least one network node element on the RDMA-capable network;
wherein the at least one network node element is further configured to:
  format an SA data query with an RDMA-capable flag; and
  allocate an RDMA write target buffer to receive the SA data using an RDMA transfer from the subnet manager in response to the SA data query;
and wherein the subnet manager is further configured to:
  configure a reliable-connected queue pair (RCQP) to send the RDMA transfer to the at least one network node element;
  publish the RCQP to the at least one network node element to cause the at least one network node element to configure a complementary RCQP;
  receive an SA data query from the at least one network node element; and
  send, using the RCQP and the complementary RCQP, an SA data response that includes the SA data to the at least one network node element using an RDMA transfer.

16. The system of claim 15, wherein the at least one network node element is further configured to add, to the SA data query, address, encryption key and buffer length information concerning the RDMA write target buffer.

17. The system of claim 15, wherein the at least one network node element is further configured to receive a status response from the subnet manager in response to the SA data query; wherein the status response is indicative that a size of the RDMA write target buffer is not capable of accommodating the SA data.

18. The system of claim 17, wherein the at least one network node element is further configured to re-allocate the RDMA write target buffer having a size that is capable of accommodating the SA data.

19. The system of claim 15, wherein the at least one network node element is further configured to receive a redirect response from the subnet manager in response to the SA data query; wherein the redirect response is indicative that the RCQP is invalid and that the SA data response is redirected to a second RCQP.

20. The system of claim 19, wherein the at least one network node element is further configured to configure the second RCQP to receive the RDMA transfer from the subnet manager.

21. The system of claim 15, wherein the SA data query comprises a query having at least one reserved data field defined by the RDMA-capable communications protocol, and wherein the RDMA-capable flag comprises an indicator, in the at least one reserved data field, that the at least one network node element is capable of receiving the RDMA transfer from the subnet manager.

22. A method for receiving subnet administration (SA) data using a remote direct memory access (RDMA) transfer, the method comprising:
formatting, by a network node element, an SA data query with an RDMA-capable flag;
configuring, by the network node element, a reliable connected queue pair (RCQP) to receive the RDMA transfer from a subnet manager in communication with the network node element on an RDMA-capable network; and
allocating, by the network node element, an RDMA write target buffer to receive the SA data using the RDMA transfer from the subnet manager in response to the SA data query.

23. The method of claim 22, further comprising adding, to the SA data query by the network node element, address, encryption key and buffer length information concerning the RDMA write target buffer.

24. The method of claim 22, wherein the SA data comprises address information of at least one network node element of the RDMA-capable network.

25. The method of claim 22, further comprising receiving, by the network node element, an SA data response on the RCQP and storing the SA data response in the RDMA write target buffer; wherein the SA data response comprises the SA data.

26. The method of claim 22, further comprising sending, by the network node element, the SA data query to the subnet manager using a predetermined unreliable datagram (UD) queue pair.

27. The method of claim 22, further comprising receiving, by the network node element, a status response from the subnet manager in response to the SA data query; wherein the status response is indicative that a size of the RDMA write target buffer is not capable of accommodating the SA data.

28. The method of claim 27, further comprising re-allocating the RDMA write target buffer having a size that is capable of accommodating the SA data.

29. The method of claim 22, further comprising receiving, by the network node element, a redirect response from the subnet manager in response to the SA data query; wherein the redirect response is indicative that the RCQP is invalid and that a response to the SA data query is redirected to a second RCQP.

30. The method of claim 29, further comprising:
configuring, by the network node element, the second RCQP to receive the RDMA transfer from the subnet manager.

31. The method of claim 22, wherein the SA data query comprises a query having at least one reserved data field defined by an RDMA communications protocol, and wherein the RDMA-capable flag comprises an indicator, in the at least one reserved data field, that the network node element is capable of receiving the RDMA transfer from the subnet manager.

\* \* \* \* \*